(12) United States Patent
Koulouh et al.

(10) Patent No.: US 11,193,647 B2
(45) Date of Patent: Dec. 7, 2021

(54) DEHUMIDIFIER FOR A CLOSED VEHICLE HEADLAMP HOUSING

(71) Applicant: AML SYSTEMS, Paris (FR)

(72) Inventors: Hassan Koulouh, Le Pré Saint Gervais (FR); Cyril Rivier, Courbevoie (FR)

(73) Assignee: AML SYSTEMS, Paris (FR)

( * ) Notice: Subject to any disclaimer, the term of this patent is extended or adjusted under 35 U.S.C. 154(b) by 64 days.

(21) Appl. No.: 16/497,732

(22) PCT Filed: Mar. 13, 2018

(86) PCT No.: PCT/FR2018/050586
§ 371 (c)(1),
(2) Date: Sep. 25, 2019

(87) PCT Pub. No.: WO2018/178532
PCT Pub. Date: Oct. 4, 2018

(65) Prior Publication Data
US 2021/0088197 A1    Mar. 25, 2021

(30) Foreign Application Priority Data
Mar. 28, 2017 (FR) .................................. 1752575

(51) Int. Cl.
*F21S 45/60* (2018.01)
*F21S 45/33* (2018.01)
*B60Q 1/04* (2006.01)

(52) U.S. Cl.
CPC ............... *F21S 45/60* (2018.01); *B60Q 1/04* (2013.01); *F21S 45/33* (2018.01)

(58) Field of Classification Search
CPC ... B60Q 1/04; F21S 45/30; F21S 45/33; F21S 45/37; F21S 45/40; F21S 45/42; F21S 45/60; H05B 3/84; H05K 5/0213
See application file for complete search history.

(56) References Cited

U.S. PATENT DOCUMENTS

2002/0121357 A1 * 9/2002 Berne ..................... F01P 1/06
165/41
2015/0330594 A1 11/2015 Ah
(Continued)

FOREIGN PATENT DOCUMENTS

| DE | 102006028295 A1 | 12/2007 |
| DE | 102015203888 A1 | 11/2015 |
| EP | 1818609 A2 | 8/2007 |

OTHER PUBLICATIONS

English Machine Translation of DE 102006028295 provided by ESPACENET (Year: 2006).*
(Continued)

*Primary Examiner* — Zheng Song
(74) *Attorney, Agent, or Firm* — Millman IP Inc.

(57) ABSTRACT

A device for dehumidifying a closed vehicle headlamp housing includes a box with an opening connecting the inside of the box with the inside of the closed housing, and an opening connecting the inside of the box with the outside of the closed housing. The device further includes a shutter for alternatively opening the opening or sealingly closing it, an actuation module configured such that the shutter closes the opening when it is activated, and a heating element for emitting heat when the actuation module is activated.

14 Claims, 5 Drawing Sheets

(56) References Cited

U.S. PATENT DOCUMENTS

2016/0084471 A1\* 3/2016 Sander .................... F21S 45/43
                                                        362/547
2017/0015235 A1\* 1/2017 Puente .................... F21S 45/30

OTHER PUBLICATIONS

English Machine Translation of DE 102006028295 provided by Google Patents (Year: 2006).\*

English Machine Translation of EP 1818609 provided by Google Patents (Year: 2007).\*

Written Opinion of the International Searching Authority dated May 3, 2018, issued in corresponding International Application No. PCT/FR2018/050586, filed Mar. 13, 2018, 6 pages.

International Preliminary Report on Patentability dated Oct. 1, 2019, issued in corresponding International Application No. PCT/FR2018/050586, filed Mar. 13, 2018, 1 page.

International Preliminary Report on Patentability for PCT Application No. PCT/FR2018/050586 dated Oct. 1, 2019 With English Translation.

Written Opinion and priority search results provided by EPO for French Application No. FR1752575 dated Nov. 6, 2019 With English Translation.

Annex to the Communication provided by the EPO for European Application No. 18714302.9 dated Sep. 18, 2020 With English Translation.

International Search Report dated May 3, 2018, issued in corresponding International Application No. PCT/FR2018/050586, filed Mar. 13, 2018, 6 pages.

Written Opinion of the International Searching Authority dated May 3, 2018, issued in corresponding International Application No. PCT/FR2018/050586, filed Mar. 13, 2018, 5 pages.

\* cited by examiner

DEHUMIDIFIER FOR A CLOSED VEHICLE HEADLAMP HOUSING

TECHNICAL SCOPE

The present invention relates to the field of vehicle headlamps with closed housing, and more particularly to a device suitable for being used to dehumidify a closed vehicle headlamp housing.

STATE OF THE ART

Headlamps constitute an important element in the safety of vehicles, in particular when the vehicle is driven at night or in atmospheric conditions requiring the use of lighting.

Generally, a vehicle headlamp comprises a housing closed by a glass and wherein is housed a light source. The housing not often being sealed, moisture can enter the housing and condense on the lens. This condensation has an influence on the lighting efficiency of the headlamp.

PRESENTATION OF THE INVENTION

The present invention relates to a device suitable for being used to dehumidify or for preventing moisture from occurring in a closed vehicle headlamp housing, thereby overcoming the abovementioned disadvantage.

For this purpose, the invention concerns a device suitable for being used to dehumidify a closed vehicle headlamp housing or for preventing moisture from occurring in said closed housing.

According to the invention, the device comprises:
a first box (2) defining a first chamber (5), the first box (2) comprising at least two series of orifices (3, 4), each series of orifices (3, 4) comprising at least one orifice, a first series of orifices (3) being configured so that the first chamber (5) communicates with the inside of the closed housing (15) and a second series of orifices (4) being configured so that the first chamber (5) communicates with the outside of the closed housing (15),
at least a first shutter (7) configured to alternatively open the orifice or the orifices of the first series of orifices (3) or to close in a sealed manner the orifice or the orifices of the first series of orifices (3),
an actuation module (8) configured so that the first shutter or shutters (7) close the orifice or the orifices of the first series of orifices (3) when the actuation module (8) is activated,
a heating element (9) configured to emit heat when the actuation module (8) is activated.

Thus, the device, which can be associated to a moisture absorber, allows moisture that risks condensing on the glass of the housing to be efficiently evacuated via the second orifice, thanks to the first shutter that prevents moisture, that has entered the box, to exit.

Furthermore, the device comprises at least a second shutter configured to, alternatively:
open the second series of orifices when the first shutter or shutters close the first series of orifices, or
close the second series of orifices when the first shutter or shutters open the first series of orifices.

Furthermore, the device comprises a second box defining a second chamber, the second box being configured so that the second chamber communicates with the first chamber via the second series of orifices, the second box comprising a third series of orifices configured so that the second chamber communicates with the outside of the closed housing.

According to a first example, the actuation module comprises:
a closing sub-module configured to close the first series of orifices via the first shutter or shutters when said actuation module is activated,
a return sub-module configured to bring the first shutter or shutters to open the first series of orifices, when said actuation module is inactivated.

Furthermore:
the closing sub-module is also configured to open the second series of orifices via the second shutter or shutters when said actuation module is activated,
the return sub-module is also configured to bring the second shutter or shutters to close the second series of orifices when said actuation module is inactivated.

According to a second example, the first shutter or shutters comprise a first plate parallel to a plane containing the first series of orifices, the first plate comprising at least a first open part and at least a first sealing part,
the actuation module being configured to move the first plate parallel to the plane containing the first series of orifices so that the first plate occupies alternatively at least one or the other of the following positions:
a first position wherein the first open part or parts coincide with the orifice or orifices of the first series of orifices to open the orifices of the first series of orifices, or
a second position wherein the first sealing part or parts coincide with the orifice or orifices of the first series of orifices to close the orifices of the first series of orifices.

Furthermore, the second shutter or shutters comprise a second plate parallel to a plane containing the second series of orifices, the second plate comprising at least a second open part and at least a second sealing part,
the actuation module being also configured to move the second plate parallel to the plane containing the second series of orifices so that the second plate occupies alternatively at least one or the other of the following positions:
a first position wherein the second open part or parts coincide with the orifice or orifices of the second series of orifices to open the orifices of the second series of orifices, when the first plate is in its second position, or
a second position wherein the second sealing part or parts coincide with the orifice or orifices of the second series of orifices to close the orifices of the second series of orifices, when the first plate is in the first position.

According to a third example, the first shutter or shutters comprise a first sealing plate parallel to a plane containing the first series of orifices,
the actuation module being configured to move the first sealing plate to a normal of the plane containing the first series of orifices so that the first sealing plate occupies at least one or the other of the following positions:
a first position wherein the first sealing plate is pressed against the orifice or orifices of the first series of orifices to close the orifices of the first series of orifices, or
a second position wherein the first sealing plate is distant from the orifice or orifices of the first series of orifices to open the orifices of the first series of orifices.

Furthermore, the second shutter or shutters comprise a second sealing plate parallel to a plane containing the second series of orifices,
the actuation module being also configured to move the second sealing plate according to a normal of the plane containing the second series of orifices so that the second sealing plate occupies at least one or the other of the following positions:

a first position wherein the second sealing plate is pressed against the orifice or orifices of the second series of orifices to close the orifices of the second series of orifices when the first sealing plate is in its second position, or a second position wherein the second sealing plate is moved away against the orifice or orifices of the second series of orifices to open the orifices of the second series of orifices when the first sealing plate is in its first position.

According to another specificity, the heating element corresponds to a component of the actuation module suitable for heating when the actuation sub-module is activated.

For example, the heating element comprises a heat resistance.

Furthermore, the heat resistance is configured to operate in an open circuit when it reaches a predetermined temperature.

According to another example, the heating element comprises an electromagnetic element.

According to a first embodiment, the device comprises a membrane sealing the orifice or orifices of the third series of orifices, the membrane being configured to let the water vapour contained in the second chamber or the first chamber out of the box.

The invention also concerns a vehicle headlamp comprising a housing sealed by a glass and housing at least one light source.

According to the invention, the housing comprises a wall through which is fixed a device suitable for being used to dehumidify said housing or to prevent moisture from occurring in said closed housing as described above, the inside of the housing communicating with the first chamber of the first box of said device through the first series of orifices, the outside of the housing communicating with the first chamber through the second series of orifices.

BRIEF DESCRIPTION OF THE FIGURES

The invention, with its characteristics and advantages, will emerge more clearly upon reading the following description made with reference to the appended drawings, wherein.

DETAILED DESCRIPTION

The following description is provided with reference to the abovementioned figures.

The invention concerns an active device 1. Said device 1 is suitable for being used to dehumidify a closed housing 15, in particular a housing 15 of a vehicle headlamp 16. Said device 1 is also suitable for preventing moisture from occurring in the closed housing 15.

In the following description, "the device suitable for being used to dehumidify a closed housing or for preventing moisture from occurring in said closed housing" is called "device" (FIGS. 1 to 5).

Figure 5:
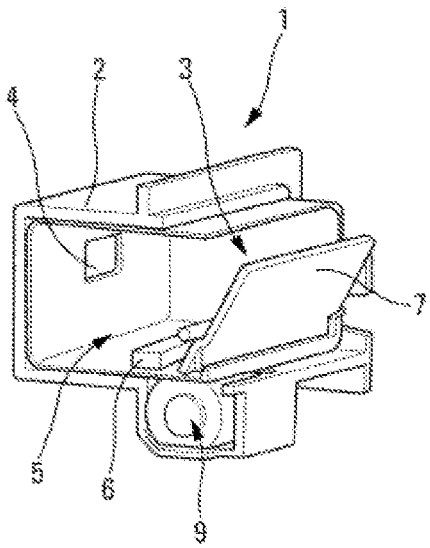
FIG. 5 represents a perspective view of the device on the side of the first series of orifices, wherein the heating element is visible according to the embodiment of FIG. 1.

The device 1 comprises a box 2 defining a chamber 5 inside the box 2. The box 2 is provided with at least two series of orifices 3 and 4. Each series of orifices 3 and 4 comprises at least one orifice. A series of orifices 3 is configured so that the chamber 5 of the box 2 communicates with the inside of the closed housing 15. A series of orifices 4 is configured so that the chamber 5 of the box 2 communicates with the outside of the closed housing 15 (FIG. 5).

An environment communicating with another environment means that there can be an exchange of fluid, such as water vapour, between both environments.

In one embodiment, the device 1 also comprises a moisture absorber 6 arranged in the chamber 5 of the box 2. The moisture absorber 6 is suitable for absorbing the moisture present in the chamber 5 of the box 2 (FIG. 5). For example, the moisture absorber 6 comprises silica gel. However, the moisture absorber can comprise any type of compound or system enabling the absorption of at least a part of the moisture that can be contained in the box 2.

Figure 1:
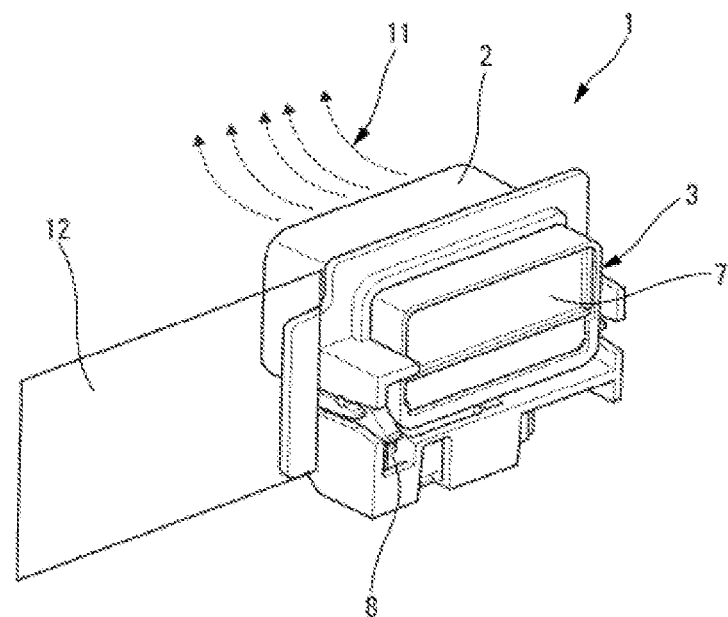
FIG. 1 represents a perspective view of the device for dehumidifying and preventing moisture from occurring on the side of the first series of orifices according to one embodiment.
Figure 2:
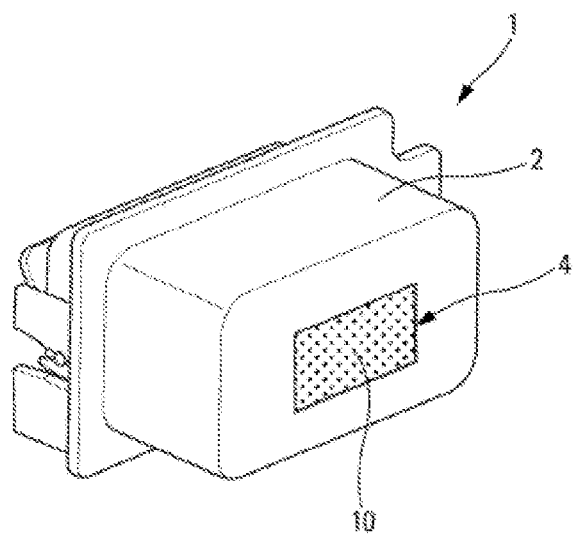
FIG. 2 represents a perspective view of the device on the side of the second series of orifices according to the embodiment of FIG. 1.
Figure 3:
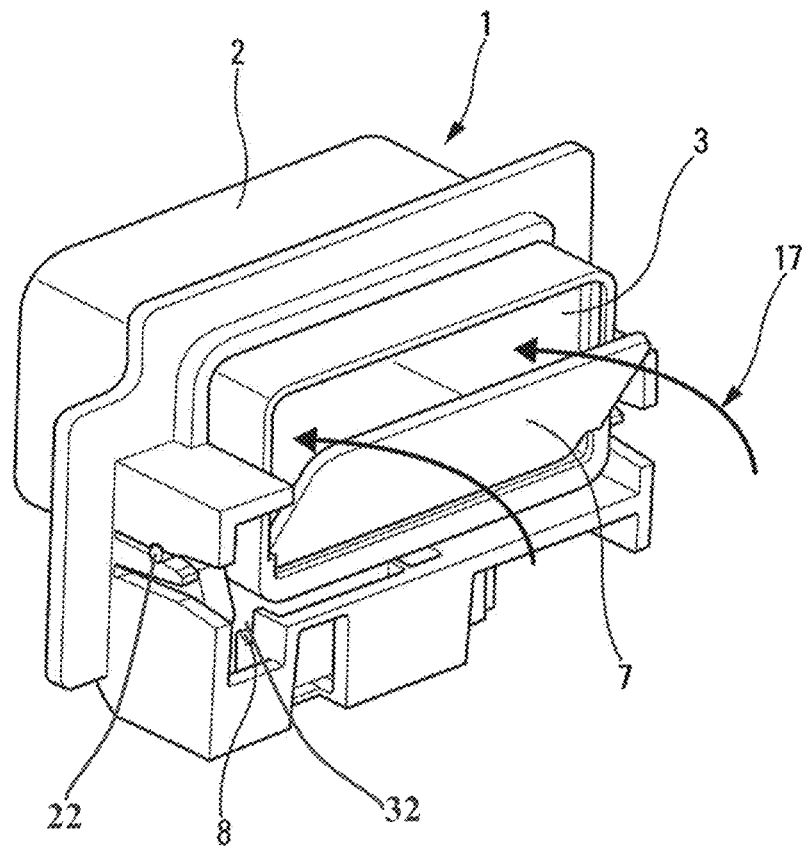
FIG. 3 represents a perspective view of the device on the side of the first series of orifices with a first shutter opening the first series of orifices according to the embodiment of FIG. 1.
Figure 4:
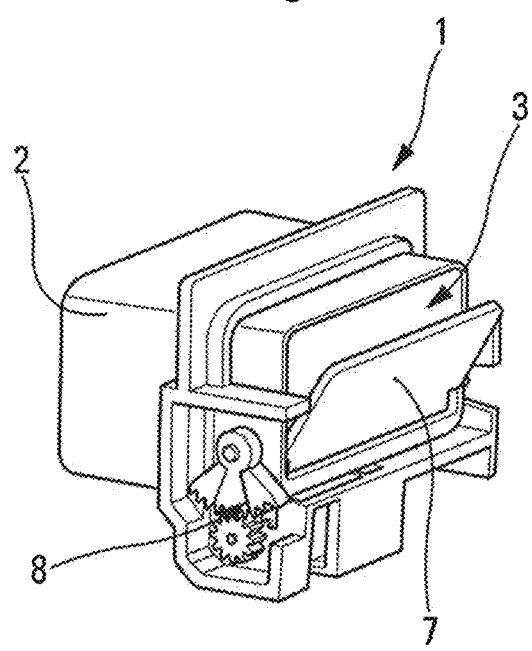
FIG. 4 represents a perspective view of the device on the side of the first series of orifices, wherein the actuation module is visible according to the embodiment of FIG. 1.

The device 1 comprises an actuation module 8 and at least one shutter 7 configured to, alternatively, open the orifice or orifices of the series of orifices 3 or close in a sealed manner the orifice or orifices of the series of orifices 3. The actuation module 8 is configured to command the shutter or shutters 7, i.e. it commands the shutter or shutters 7 so that they close the orifice or orifices of the series of orifices 3 when said actuation module 8 is activated (FIG. 4).

Furthermore, the device 1 comprises a heating element 9 configured to emit heat when the actuation module 8 is activated.

According to one embodiment (FIGS. 7 to 14), the device comprises at least one second shutter 18 configured to, alternatively:
- open the second series of orifices 4 when the first shutter or shutters 7 close the first series of orifices 3 or,
- close the second series of orifices 4 when the first shutter or shutters 7 open the first series of orifices 3.

According to a preferred embodiment, the device 1 further comprises a box 19 defining a chamber 20. The box 19 is configured so that the chamber 20 communicates with the chamber 5 through the series of orifices 4. The box 19 comprises a series of orifices 21 configured so that the chamber 19 communicates with the outside of the closed housing 15.

According to a first example (FIGS. 1 to 5), the actuation module 8 comprises:
- a closing sub-module 32 configured to close the series of orifices 3 via the shutter or shutters 7 when the actuation module 8 is activated,
- a return sub-module 22, such as a spring, configured to force the shutter or shutters 7 to open the series of orifices 3 when said actuation module 8 is inactivated.

In this first example, when the actuation module 8 is activated, the closing sub-module 32 exerts a force acting against the force exerted by the return sub-module 22 so that the shutter or shutters 7 close the series of orifices 3.

According to a variant of the first example, the closing sub-module 32 of the actuation module 8 is also configured to open the series of orifices 4 via the shutter or shutters 18 when said actuation module 8 is activated. Furthermore, the return sub-module 22 is also configured to bring the shutter or shutters 18 to close the second series of orifices 4 when said actuation module 8 is inactivated.

According to a second example (FIGS. 7 to 10), the shutter or shutters 7 comprise a plate 23 parallel to a plane containing the series of orifices 3. The plate 23 comprises at least an open part 24 and at least a sealing part 25. For example, the plate 23 comprises a full plate comprising openings. The open part or parts 24 correspond to one or several openings. The sealing part or parts 25 correspond to the parts between the opening or openings.

In this second example, the actuation module 8 is configured to move the plate 23 parallel to the plane containing the series of orifices 3 so that the plate 23 occupies alternatively at least one or the other of the following positions:
- a first position wherein the open part or parts 24 coincide with the orifice or orifices of the series of orifices 3 to open the orifices of the series of orifices 3, or
- a second position wherein the sealing part or parts 25 coincide with the orifice or orifices of the series of orifices 3 to close the orifices of the series of orifices 3.

In these two positions, the plate 23 remains pressed against the series of orifices 3.

According to a variant of this second example, the shutter or shutters 18 comprise a plate 26 parallel to a plane containing the series of orifices 4. Similarly to the first plate 23, the plate 26 comprises at least an open part 27 and at least a sealing part 28.

In this variant, the actuation module 8 being also configured to move the plate 26 parallel to the plane containing the series of orifices 4 so that the plate 26 occupies alternatively at least one or the other of the following positions:
- a first position wherein the open part or parts 27 coincide with the orifice or orifices of the series orifices 4 to open the orifices of the series of orifices 4, when the plate 23 is in its second position, or
- a second position wherein the sealing part or parts 28 are in alignment with the orifice or orifices of the series orifices 4 to close the orifices of the series of orifices 4, when the plate 23 is in its first position.

In these two positions, the plate 26 remains pressed against the series of orifices 4.

As represented in FIGS. 7 to 10, the actuation module 8 can move the shutter or shutters 7 and/or the shutter or shutters 18 by rotation. The actuation module 8 can therefore comprise a motor provided with a motor shaft A perpendicular to the shutter(s) 7 and 18 and suitable for rotationally driving the plate 23 and/or the plate 26 about the axis of the motor shaft A or of a motor shaft B parallel to the motor shaft A by means of a gearing. Preferably, the motor is a direct current motor.

According to a third example (FIGS. 11 to 14), the shutter or shutters 7 comprise a sealing plate 29 parallel to a plane containing the series of orifices 3.

In this third example, the actuation means 8 is configured to move the sealing plate 29 in translation according to a normal of the plane containing the series of orifices 3 so that the sealing plate 29 occupies at least one or the other of the following positions:
- a first position wherein the sealing plate 29 is pressed against the orifice or orifices of the series of orifices 3 to close the orifices of the series of orifices 3, or
- a second position wherein the sealing plate 29 is moved away from the orifice or orifices of the series of orifices 3 to open the orifices of the series of orifices 3.

In the variant of the third example, the shutter or shutters 18 further comprise a sealing plate 30 parallel to a plane containing the series of orifices 4.

In this variant, the actuation means 8 is also configured to move the plate 30 in translation according to a normal of the plane containing the series of orifices 4 so that the sealing plate 30 occupies one or the other of the following positions:
- a first position wherein the sealing plate 30 is pressed against the orifice or orifices of the series of orifices 4 to close the orifices of the series of orifices 4 when the sealing plate 29 is in its second position, or
- a second position wherein the sealing plate 30 is moved away against the orifice or orifices of the series of orifices 4 to open the orifices of the series of orifices 4 when the sealing plate 29 is in its first position.

As represented in FIGS. 11 to 14, in this third example, the shutter or shutters 7 and/or the shutter or shutters 18 can be driven simultaneously in translation by the actuation module 8. The actuation module 8 can therefore comprise a motor provided with a motor shaft A parallel to the sealing plates 29 and 30 and suitable for driving the plate 29 and/or the plate 30 in translation by means of a gearing P. Preferably, the motor is a direct current motor.

Thus, when the shutter or shutters 7 are open, the moisture 17 contained in the housing 15 of the headlamp 16 enters in the box 2 of the device 1.

For example, the moisture can be absorbed by a moisture absorber 6.

For example, the heat emitted by the heating element 9 is suitable for transforming the moisture absorbed by the moisture absorber 6 into water vapour. The water vapour 11 is then evacuated via the orifice 4 towards the outside of the box 2.

According to one embodiment, the heating element 9 corresponds to a component of the actuation module 8 suitable for heating when the actuation sub-module is activated.

The heating element 9 can comprise or correspond to a heat resistance. The heat resistance is configured to operate in an open circuit when it reaches a predetermined temperature.

According to another example, the heating element 9 comprises an electromagnetic element. The electromagnetic element can be an electromagnet enabling the actuation module 8 to close the shutter 7 when said actuation module 8 is activated.

The moisture absorber 6 can correspond to a component suitable for absorbing moisture, such as silica gel. Said component can coat the inner surface of the box 2, but it can also be contained in an internal housing provided near the heating element 9. The silica can also be contained in or on an adhesive support suitable to adhere onto a surface contained in the chamber 5.

According to one embodiment (FIG. 2), the device 1 comprises a membrane 10 sealing the series of orifices 4. According to one embodiment, the device 1 comprises a membrane 10 sealing the series of orifices 21. The membrane 10 is configured to let the water vapour 11 present in the box 2 out of the chamber 20. The water vapour contained in the box 2 and evacuated by the series of orifices 21 can correspond to the moisture previously absorbed by the moisture absorber 6, which has been transformed into water vapour by the heat transmitted by the heating element 9 or to moisture contained in the chambers 5, 20 and that has not been absorbed by the moisture absorber 6.

Figure 6:
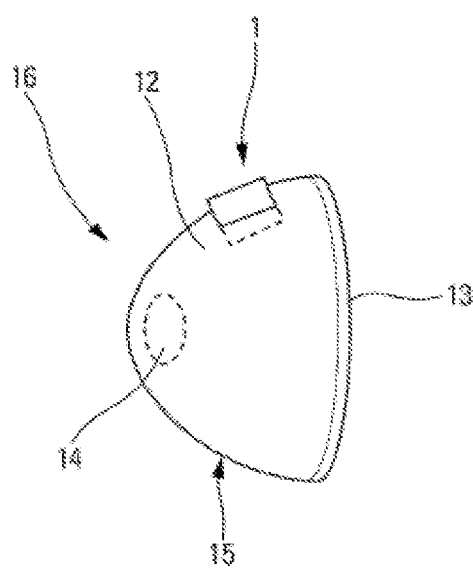
FIG. 6 represents a schematic view of a vehicle headlamp comprising the device.
Figure 7:
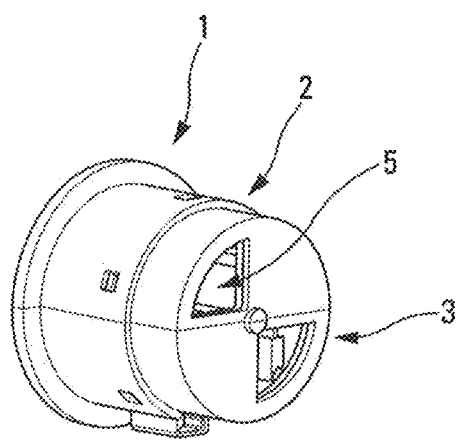
FIG. 7 represents a perspective view of the device on the side of the first series of orifices according to another embodiment.
Figure 8:
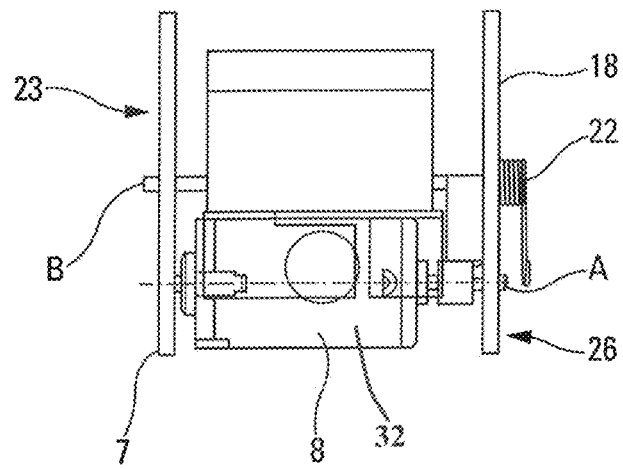
FIG. 8 represents a profile view of the shutters and of the actuation module according to the embodiment of FIG. 7.
Figure 9:
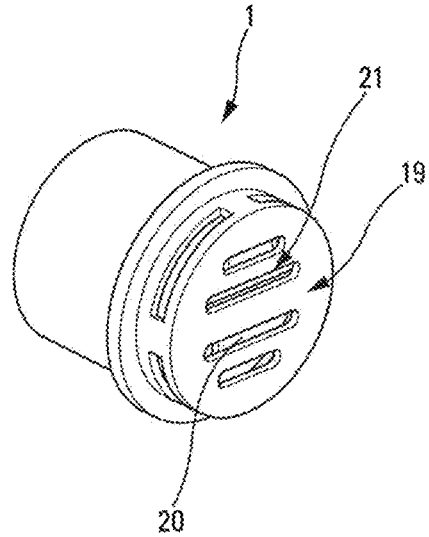
FIG. 9 represents a perspective view of the device on the side of the second series of orifices according to the embodiment of FIG. 7.
Figure 10:
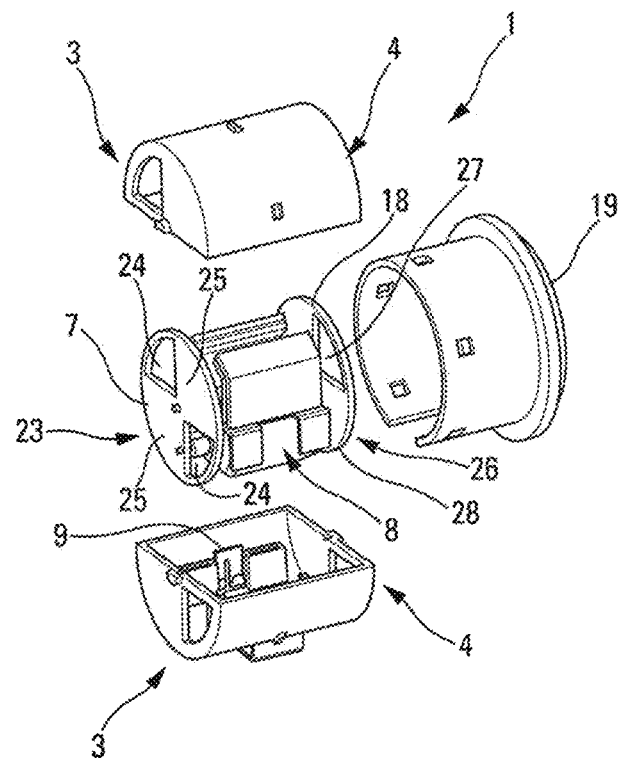
FIG. 10 represents an exploded view of the device according to the embodiment of FIG. 7.
Figures 11, 12:
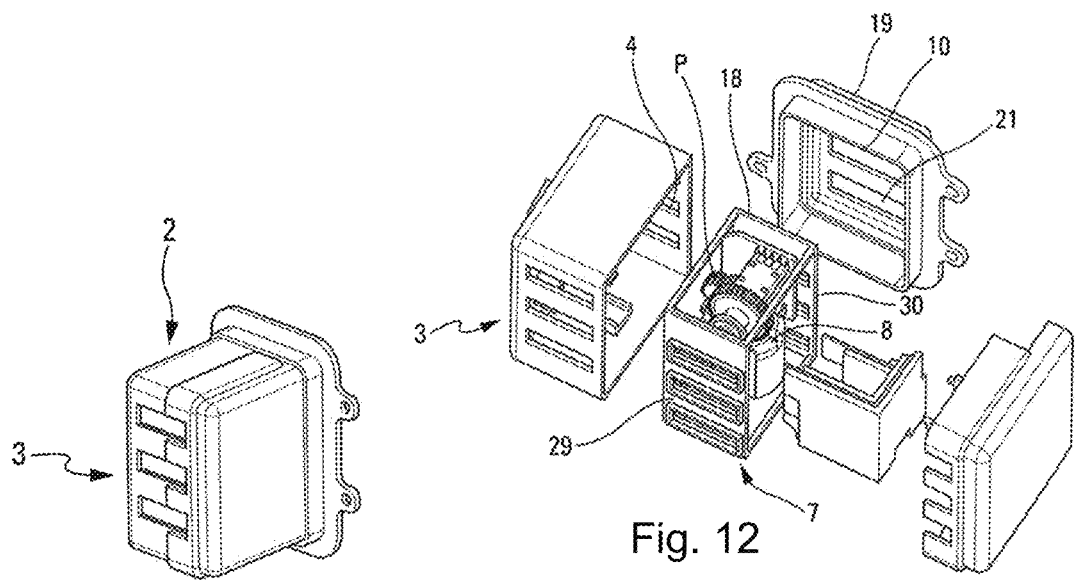
FIG. 11 represents a perspective view of the device on the side of the first series of orifices according to another embodiment.
FIG. 12 represents an exploded view of the device according to the embodiment of FIG. 11.
Figures 13, 14:
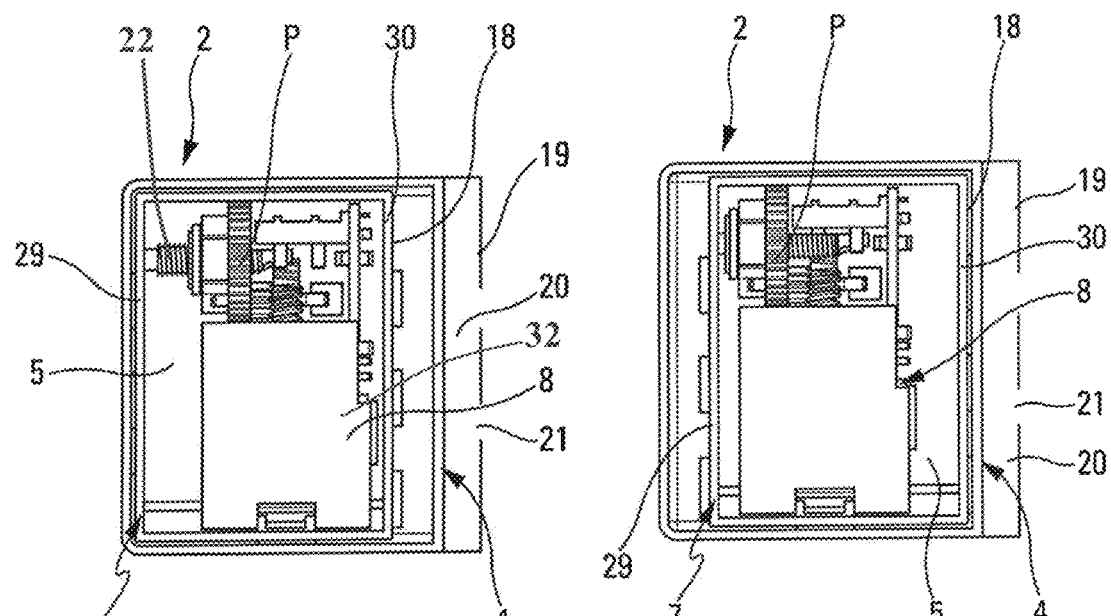
FIG. 13 represents a profile view of a cross-section of the device wherein the first shutter or shutters close the first series of orifices according to the device of FIG. 11.
FIG. 14 represents a profile view of a cross-section of the device wherein the second shutter or shutters close the second series of orifices according to the device of FIG. 11.

The invention also concerns a vehicle headlamp 16 comprising a housing 15 closed by a glass 13 and housing at least one light source 14 (FIG. 6).

The closed housing 15 comprises a wall 12 through which is fixed a device 1 such as described above.

The inside of the housing 15 communicates with the chamber 5 of the first box 2 of said device 1 via a series of orifices 3 and the outside of the housing 15 communicates with the chamber 5 of the first box 2 of said device 1 via the second series of orifices 4.

The present description details various embodiments with reference to the figures and/or the technical characteristics. The person skilled in the art will understand that the various technical characteristics and embodiments can be combined to obtain other embodiments, unless it is explicitly mentioned otherwise or unless these technical characteristics are incompatible. Likewise, a technical characteristic of an embodiment can be isolated from the other technical characteristics of the same embodiment, unless mentioned otherwise. In the present description, numerous specific details are provided by way of example and are in no way limited thereto, so as to detail precisely the invention. The person skilled in the art will however understand that the invention can be achieved in the absence of one or several of these specific details or with variants. In other occasions, some aspects are not detailed to avoid obscuring and weighing down the present description, and the person skilled in the art will understand that diverse and varied means can be used and that the invention is not limited to the described examples.

It should be obvious to persons skilled in the art that the present invention enables embodiments in many other specific forms without departing from the scope of the invention as claimed. Consequently, the present embodiments must be considered as examples, but can be modified within the scope of the appended claims, and the invention cannot be limited to the details provided below.

The invention claimed is:

1. A device for dehumidifying a closed housing of a vehicle headlamp to prevent moisture from occurring in said closed housing, the device comprising:
    a first box defining a first chamber, the first box comprising at least two series of orifices, each series of orifices comprising at least one orifice, one first series of orifices being configured so that the first chamber communicates with the inside of the closed housing and a second series of orifices being configured so that the first chamber communicates with the outside of the closed housing,
    at least a first shutter configured to alternatively open the orifice or orifices of the first series of orifices and close in a sealed manner the orifice or orifices of the first series of orifices,
    an actuation module configured so that the first shutter or shutters close the orifice or the orifices of the first series of orifices when the actuation module is activated,
    a heating element configured to emit heat when the actuation module is activated,
    a second box defining a second chamber, the second box being configured so that the second chamber communicates with the first chamber via the second series of orifices, the second box comprising a third series of orifices configured so that the second chamber communicates with the outside of the closed housing.

2. The device according to claim 1, wherein the actuation module comprises:
    a closing sub-module configured to close the first series of orifices via the first shutter or shutters when said actuation module is activated, and
    a return sub-module configured to bring the first shutter or shutters to open the first series of orifices when said actuation module is inactivated.

3. The device according to claim 2, wherein:
    the closing sub-module is configured to open the second series of orifices via the second shutter or shutters when said actuation module is activated, and
    the return sub-module is configured to bring the second shutter or shutters to close the second series of orifices when said actuation module is inactivated.

4. The device according to claim 1, wherein the heating element comprises a heat resistance.

5. The device according to claim 4, wherein the heat resistance is configured to operate when the heating element reaches a predetermined temperature.

6. The device according to claim 1, further comprising at least a second shutter configured to, alternatively:
    open the second series of orifices when the first shutter or shutters close the first series of orifices, and
    close the second series of orifices when the first shutter or shutters open the first series of orifices.

7. The device according to claim 1, wherein the first shutter or shutters comprise a first plate parallel to a plane containing the first series of orifices, the first plate comprising at least a first open part and at least a first sealing part, the actuation module being configured to move the first plate parallel to the plane containing the first series of orifices so that the first plate occupies alternatively at least one or the other of the following positions:
    a first position wherein the first open part or parts coincide with the orifice or orifices of the first series of orifices to open the orifices of the first series of orifices, and
    a second position wherein the first sealing part or parts coincide with the orifice or orifices of the first series of orifices to close the orifices of the first series of orifices.

8. The device according to claim 1, wherein the second shutter or shutters comprise a second plate parallel to a plane containing the second series of orifices, the second plate comprising at least a second open part and at least a second sealing part, the actuation module also being configured to move the second plate parallel to the plane containing the second series of orifices so that the second plate occupies alternatively at least one or the other of the following positions:
- a first position wherein the second open part or parts coincide with the orifice or orifices of the second series of orifices to open the orifices of the second series of orifices, when the first plate is in its second position, and
- a second position wherein the second sealing part or parts coincide with the orifice or orifices of the second series of orifices to close the orifices of the second series of orifices, when the first plate is in the first position.

9. The device according to claim 1, wherein the first shutter or shutters comprise a first sealing plate parallel to a plane containing the first series of orifices, the actuation plate being configured to move the first sealing plate according to a normal of the plane containing the first series of orifices so that the first sealing plate occupies at least one or the other of the following positions:
- a first position wherein the first sealing plate is pressed against the orifice or orifices of the first series of orifices to close the orifices of the first series of orifices, and
- a second position wherein the first sealing plate is moved away from the orifice or orifices of the first series of orifices to open the orifices of the first series of orifices.

10. The device according to claim 1, wherein the second shutter or shutters comprise a second sealing plate parallel to a plane containing the second series of orifices, the actuation module also being configured to move the second sealing plate according to a normal of the plane containing the second series of orifices so that the second sealing plate occupies at least one or the other of the following positions:
- a first position wherein the second sealing plate is pressed against the orifice or orifices of the second series of orifices to close the orifices of the second series of orifices when the first sealing plate is in its second position, and
- a second position wherein the second sealing plate is moved away against the orifice or orifices of the second series of orifices to open the orifices of the second series of orifices when the first sealing plate is in its first position.

11. The device according to claim 1, wherein the heating element corresponds to a component of the actuation module that is configured to emit heat when the actuation module is activated.

12. The device according to claim 1, wherein the heating element comprises an electromagnetic element.

13. The device according to claim 1, further comprising a membrane sealing the orifice or orifices of the third series of orifices, the membrane being configured to let water vapour present in the second chamber or in the first chamber out of the box.

14. A vehicle headlamp comprising a housing closed by a glass and housing at least one light source, wherein the housing comprises a wall through which is attached a device configured to dehumidify said housing or to prevent moisture from occurring in said closed housing according to claim 1, the inside of the housing communicating with the first chamber of the first box of said device via the first series of orifices, the outside of the housing communicating with the first chamber via the second series of orifices.

* * * * *